Dec. 7, 1937.　　　　N. B. LUND　　　　2,101,081
RAKING MECHANISM FOR SEDIMENTATION TANKS
Original Filed Jan. 4, 1935　　3 Sheets-Sheet 2

INVENTOR.
NELS B. LUND,
BY
Arthur Middleton
ATTORNEY.

Dec. 7, 1937.   N. B. LUND   2,101,081
RAKING MECHANISM FOR SEDIMENTATION TANKS
Original Filed Jan. 4, 1935   3 Sheets-Sheet 3

INVENTOR.
NELS B. LUND,
BY Arthur Middleton
ATTORNEY.

Patented Dec. 7, 1937

2,101,081

UNITED STATES PATENT OFFICE 2,101,081

RAKING MECHANISM FOR SEDIMENTATION TANKS

Nels B. Lund, Seaford, N. Y., assignor to The Dorr Company, Inc., New York, N. Y., a corporation of Delaware Application January 4, 1935, Serial No. 357
Renewed June 19, 1937

9 Claims. (Cl. 210—3)

This invention relates to reciprocating sludge conveying or removal mechanism for sedimentation tanks of the type usable for water or sewage purification. More specifically it relates to driving mechanisms including a flexible linear driving element for a reciprocable sludge- or pulp-raking or conveying member in the tank.

A problem in the automatic operation of such mechanisms lies in the proper, simple and reliable coordination of the various operating phases of the reciprocable carriage which supports the sludge conveyor or rake; that is to say, the sludge conveyor carriage must be propelled along a path at the top of the tank to allow a depending and usually pivoted sludge conveyor member which includes a raking blade to travel along the bottom of the tank towards a point of sludge outlet. Having reached the terminal position of its raking stroke the free end of the pivoted sludge conveyor must be controlled or positioned while the carriage is at rest. With the sludge conveyor or collector raised and inoperative, the carriage is to be returned to its initial point of active operation where it stops just long enough to have the sludge collector lowered toward the bottom into sludge raking position.

One object of this invention is to produce a sludge conveying or raking mechanism which is controlled from a central source in a positive manner, and which is reliable in each of its operating phases; and which needs a minimum of maintenance and attention. Another object is to devise an improved control arrangement which needs no movable electric connections.

In order to attain these ends this invention proposes to propel the carriage in a positive non-friction manner through the medium of a flexible drive including motor means, and to use the pull of the driving rope for a dual purpose. Consequently the periodical movement of the sludge conveying member or collector is made directly dependent upon and subordinate to the movement of the main or carriage drive. This invention therefore proposes to use a positively acting flexible drive or linear flexible driving element for the dual purpose of propelling the carriage and controlling the sludge collecting member. This dual or combined function is realizable when provision is made for the pull of a driving rope to continue after the carriage has reached either of its terminal positions, and this continued pull or relative slippage is made effective to control the positioning of the sludge collecting member. In other words, whereas during the travelling of the carriage the driving rope appears to be fixed thereto to exert a direct driving pull, provision is made at the end of the stroke for intermediate mechanism to become effective to permit driving movement of the rope to continue relative to the now stationary carriage and to be translated into raising movement of the sludge collector upon the carriage. After the sludge collector has thus been actuated at the end of a carriage stroke, reversal of the carriage may automatically take place simultaneously with reestablishing the fixed driving relation between the driving rope and the carriage.

According to one feature of this invention all operating phases which constitute full automatic operation of the apparatus are controlled from a central source, that is to say the whole timing cycle including the propulsion, the setting and resetting of the sludge collector, and the operation of a carriage reversal switch, all are centrally controlled and coordinated to each other through certain established and re-occurring phases in the pull of the main driving rope. In other words all partial phases of the operation are made subordinate to the controlling movement or pull of the main driving rope.

Another feature of the invention provides for a reversible flexible or rope drive arrangement in conjunction and operative association with a winding drum for the sludge collector; and it also provides for suitable mechanism for rendering the driving rope alternately operable for carriage propulsion and for sludge collector positioning respectively.

According to another feature there are provided certain rotation checking, locking, or clutching means in conjunction with the winding drum, which means are selectively controllable by stationary abutments or the like at predetermined intervals and during certain operating phases, in order to effect the conditioning of the driving rope for its alternate functions of carriage propulsion and of sludge collector positioning respectively.

Still other features relate to the arrangement of a prime mover and associated (power control) mechanism to control the automatic operation of the sludge raking mechanism.

Further aspects of advantage will be evident by comparison of the present rope driven mechanism with sludge collector or conveyor carriages of the automatically moving or self-propelling type. The latter type usually depends on the track friction of its carriage wheels for locomotion and thus may be subject to slippage of the wheels upon the tracks, whereas the type of mechanism herein preferred may be said to belong to the positively driven class being controlled from stationary points outside the track or guiding surface.

Moreover the self-propelling type of carriage in order to execute various phases of its operation requires driving and auxiliary motors respectively, for propelling the carriage or for positioning the rake, as the case may be. These motors are mounted on the self-propelling type of carriage and in turn require movable connections in that they must draw their electric current from an overhead live wire, or from some suitable kind of a live rail, or else from an automatic reel to take care of the varying length of electric cable for feeding the travelling motors. Such arrangements are in need of special attention inasmuch as exposed, moving, or non-stationary motor connections constitute potential sources of disturbance. It is an advantage of the present class of positively driven carriages to avoid such connections by the use of stationary motors.

Still another aspect of advantage lies in the fact that in a positively or rope driven mechanism the sludge conveyor carriage and its guiding tracks may be submerged where lack of sufficient headroom makes such arrangement desirable, when the rope driving motor if stationary may be located accessibly at any suitable place above the liquid. A self-propelling motor driven carriage cannot readily operate in submergence.

In a preferred embodiment a reversible flexible drive comprises preferably an endless main drive rope which extends the length of the tank and has normally fixed or driving relation to the carriage through the intermediary of a winding drum the potential rotation of which serves to raise or lower the sludge conveying member. When the rotation of the drum is checked in both directions the driving rope which is coiled around the drum will have fixed driving relation to the carriage and propel it as long as the drive is operating. If at the end of a carriage stroke the drum is released and free to rotate in the direction of continued rope movement it will eo ipso be effective to lift or lower the sludge conveyor as the case may be.

A pawl and ratchet arrangement or any other controlled locking or clutching device is unitary with the winding drum and it is abutment- or cam-controlled or influenced at suitable points of the carriage stroke so that a continued movement or slippage of the rope relative to the carriage should bring the sludge conveyor to active and inactive sludge raking positions respectively after the carriage has reached a stop.

The operation can be made fully automatic merely by reversing the stationary rope drive at the proper times, for instance by utilizing the movement of the rope when slipping or moving relative to a stationary switch to effect reversal at the proper moment of the stationary rope driving motor. In such case it can be said that the switch is the primary control factor relative to a cycle of subordinate mechanical phases of a full automatic operation.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto. It should be understood that the general arrangement within the scope of this patent may also include a double-acting mechanism which moves sludge in both directions.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a view of a longitudinal tank section showing the carriage and sludge collector in operative travelling position.

Figure 1:
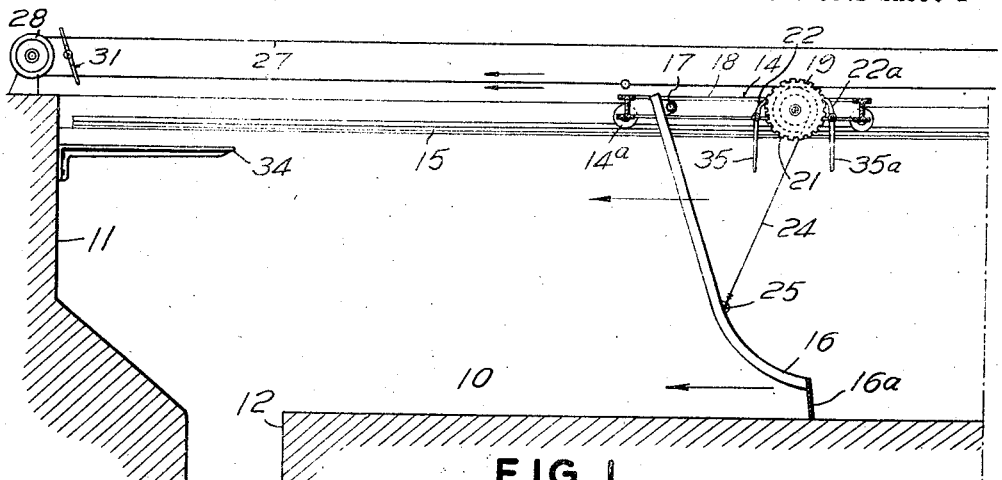

The longitudinal sedimentation tank here under consideration is designated by the numeral 10. It has a front end wall 11 where a sump or sludge outlet 12 is located, and a rear end wall 13. A sludge collecting and conveying mechanism for this tank includes a carriage 14 operable by way of carriage wheels 14a on track rails 15 for reciprocating travelling movement along the top portion of the tank.

A sludge collecting and conveying member or scraper 16 having a scraper blade 16a is pivotally suspended at 17 from the framework 18 of the carriage upon which is also mounted a sludge scraper control mechanism collectively indicated by the numeral 19, and by which the sludge collector 16 may be raised and lowered between its operative and inoperative positions relative to the sludge on the tank bottom.

The control mechanism 19 (see Fig. 6) includes a main winding drum 20 rotatable upon the carriage frame together and unitary with a ratchet wheel 21 normally held locked both ways against rotation by a pair of pawls 22 and 22a arranged opposite each other to selectively engage upon the front or rear portion respectively of the ratchet wheel 21. Coaxial and rotatable with the main winding drum is a smaller auxiliary drum or winch 23 to which is fixed at 23a one end of a scraper raising rope 24. The other end of this rope holds the sludge collector or scraper 16 at 25. It is clear that rotation of the main hoisting drum in one or the other direction if released from the grip of the respective pawls will raise or lower the sludge scraper relative to the bottom.

In order to effect periodic one way removal of the sludge into the sump the sludge scraper must be controlled to take its operative and inoperative positions respectively at certain end phases of the carriage stroke. According to the invention the respective positioning or setting and resetting of the sludge scraper 16 is automatically timed and synchronized with and subordinated to an automatic carriage reciprocation by way of a reversible rope drive arrangement. Hence the subordinate movement control of the sludge scraper 16 will be more clearly understood from a detailed description of the reversible main rope drive presently to be shown.

Figure 8:
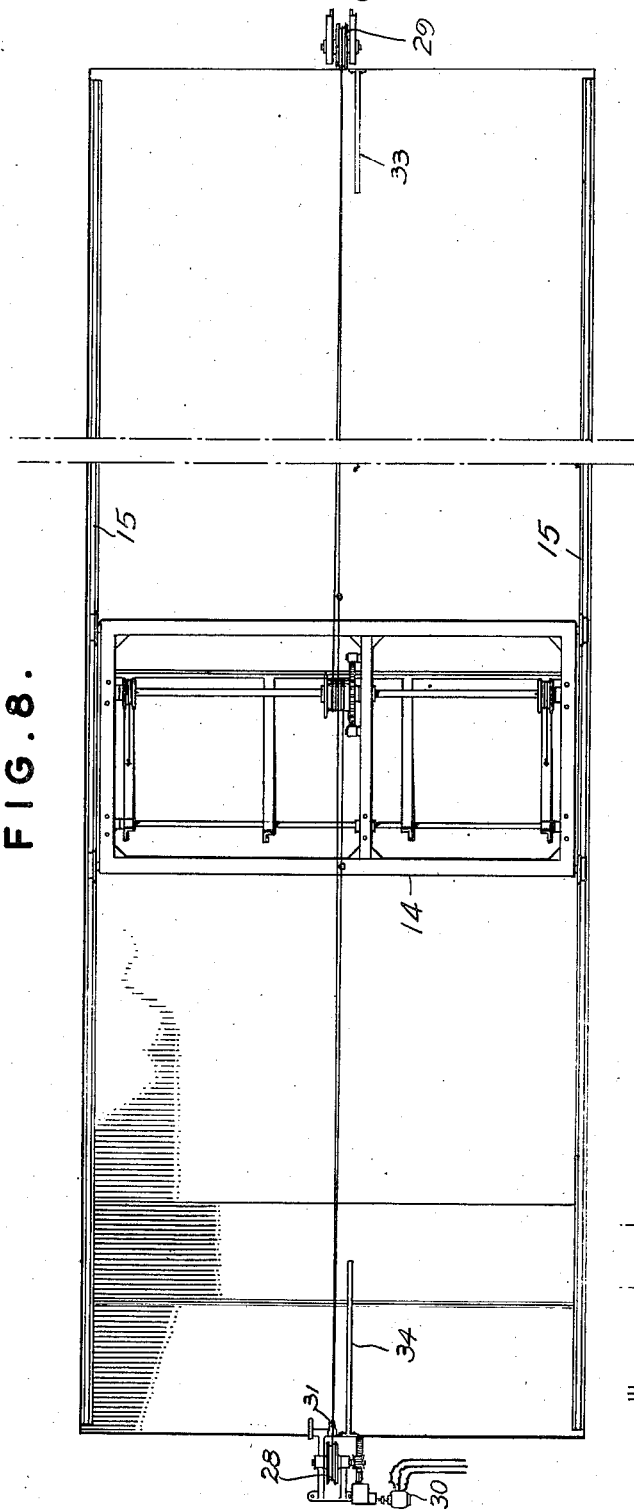
Fig. 8 is a plan view of the tank and sludge conveying mechanism.

A rope driving arrangement is designed to impart to the carriage a positive reciprocating travelling movement and to this end includes diagrammatically shown driving rope 27 operating over stationary pulleys 28 and 29 at each end of the tank, driven by a stationary motor arrangement 30 (see Figs. 8 and 9) controlled by a reversal switch indicated at 31.

Figure 6:
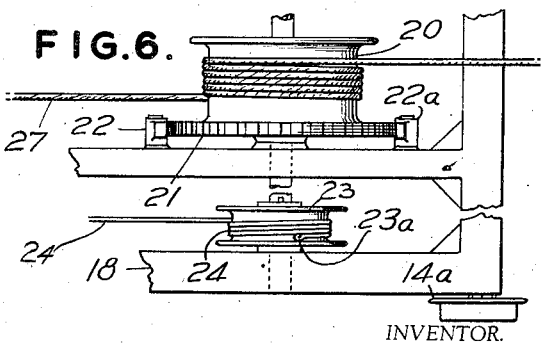
Fig. 6 is a detail plan view of the rope operated hoisting mechanism on the carriage.

In Fig. 6 it can be seen that the main driving rope is coiled around and frictionally held upon the main winding drum 20 of the scraper control mechanism 19. Consequently it will be clear from the general arrangement shown in the drawings that, in case the carriage be kept still and the pawls 22 and 22a respectively be disengaged from their ratchet wheel 21, the main driving rope 27 can be rendered operative to raise or lower the sludge scraper by a corresponding rotation in one or the other direction of the main winding drum 20. It will also be noted that at each end of the tank there is provided a stationary cam or abutment member 33 and 34 respectively adapted to cooperate with a depending free portion 35a and 35 respectively of the pawls 22a and 22. That is to say as the rope driven carriage alternately approaches these cam-members 33 and 34 a respective pawl will be disengaged from its ratchet locking position so that upon stoppage of the carriage a continued pull of the main driving rope will become operative to rotate the now released winding drum and cause the raising or the lowering of the sludge scraper as the case may be. In other words the cooperation of the cam-members 33 and 34 with the locking pawls 22a and 22 is effective to condition the rope drive for temporary actuation of the sludge scraper 16 so that the carriage driving rope 27 will then temporarily act as a scraper actuating rope.

Figure 7:
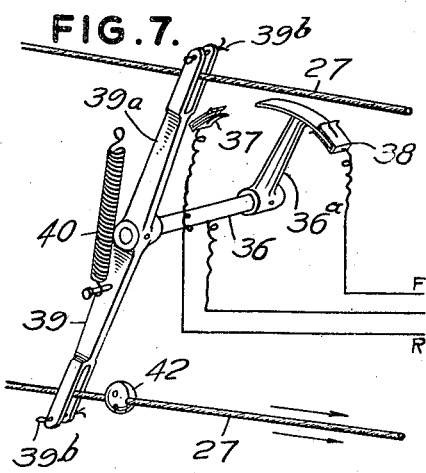
Fig. 7 is a perspective detail view of a rope-operated switch for reversing the rope drive.
Figure 9:
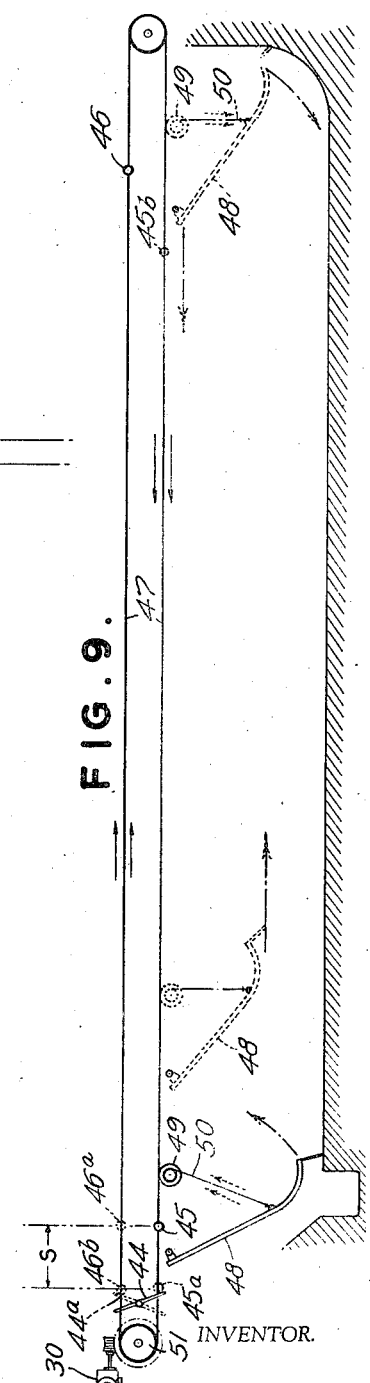
Fig. 9 is a longitudinal diagrammatic sectional view of the sludge conveying mechanism to indicate the functioning of the rope operated switch mechanism for carriage reversal.

Figs. 7 and 9 illustrate an electric switch mechanism and its function to effect carriage reversal at predetermined phases of the operation. Such mechanism may be said to constitute the primary control in an automatic operating cycle, to which are subordinated the functions of the carriage 14, of the winding drum 20, of the pawls 22 and 22a, and of the sludge scraper or raking element 16. According to Fig. 7 the switch is shown to include a stationary rocking shaft 36, carrying at one end a rising T-shaped arm 36a to make alternate contact with terminals 37 and 38 respectively of motor controlling electric conduits. The other end of the rocking shaft has fixed thereto oppositely arranged actuating arms 39 and 39a held by an overthrow spring 40 in its respective contact making positions. Each arm 39 and 39a respectively has a bifurcated end through which may pass an adjacent strand of the driving rope 27 to be confined therein by cotter pins 39b. The operation of the switch is indicated by a dog member 42 fixed at a certain point upon the driving rope.

The diagram of Fig. 9 shows more clearly the manner in which the driving rope actuates a motor reversal switch which is diagrammatically indicated at 44, through what may be called complementary dog members 45 and 46 fixed at certain points of the active lower and the idle upper strand respectively of a driving rope 47. The numeral 48 indicates the travelling sludge raking member. 49 is the winding drum for a scraper positioning rope 50. S indicates the amount of potential relative rope movement, that is the slippage of the driving rope relative to the carriage when the rope is effective to position the sludge raking element. 51 collectively indicates the driving aggregate and driving sheave for the rope 47.

Figure 2:
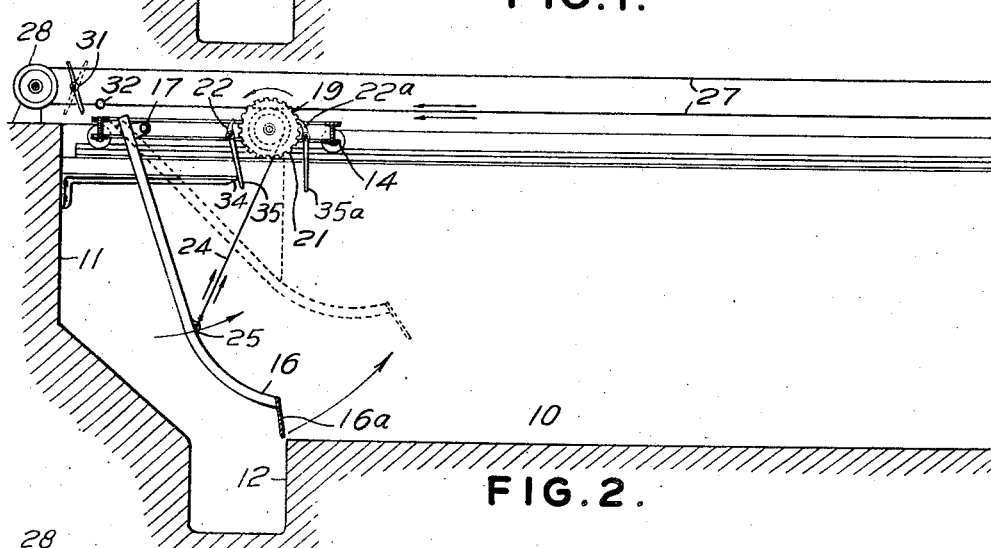
Fig. 2 is a view of a longitudinal tank section showing the carriage in conveying end position and the sludge collector as being rendered inoperative.
Figure 3:
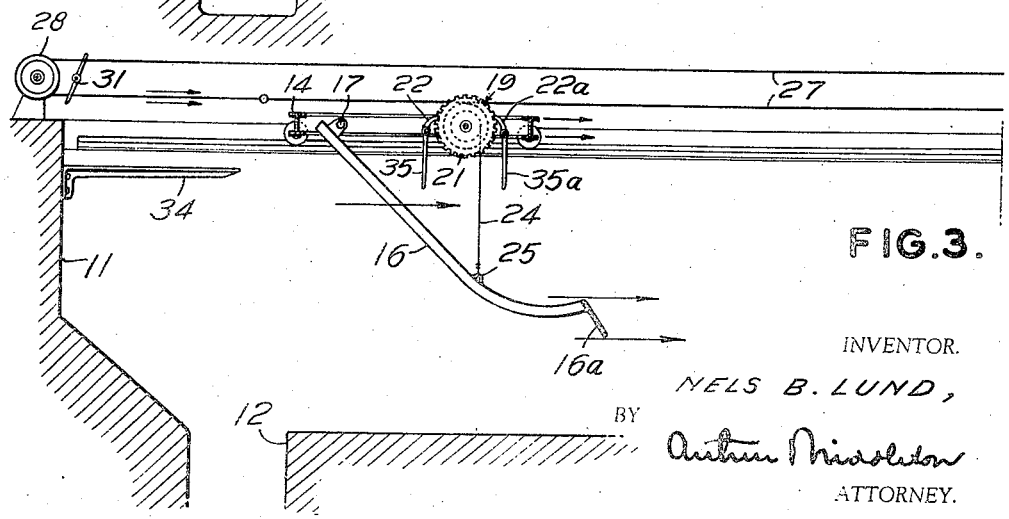
Fig. 3 is a view of a longitudinal tank section showing the carriage with the sludge collector on its inoperative return stroke.

The automatic operation of the sludge collecting or conveying mechanism is described as follows: Assuming the carriage (as in Fig. 1) to be on its way to the left hand or sludge outlet end of the tank and to be propelled by the lower strand of the driving rope 27. The pull of the driving rope is operative at this phase to positively propel the carriage along the track or guides 15 since the drum 20 upon the carriage frame is locked through pawl 22 against relative rotation by the driving rope 27. Also, the drum 20 appears to be locked in a position which determines the free length of the auxiliary winding rope 24 and thereby the operative position of the sludge scraper 16 relative to the tank bottom. As the carriage reaches the sludge outlet end of the tank, the sludge collected by the scraper 16a is pushed into the sump 12. The sludge being disposed of, the scraper 16a must be raised to inoperative position preparatory to the return movement of the carriage. This is at once effected when towards the end of the carriage stroke the free end 35 of pawl 22 engages upon the stationary abutment or cam member 34 thus releasing the winding drum for rotation in a direction to lift the sludge scraper to inoperative position. Since meanwhile the carriage has come to an end stop, the continued pull of the driving rope 27 is at once conditioned and rendered effective to raise the sludge scraper by relatively rotating the drum 20. After the scraper has thus reached its predetermined upper position (see dotted position in Fig. 2) the movement of the carriage is reversed as a dog member 32 fixed at a certain point upon the drive rope 27 operates the reversal switch 31 causing the reversal of the rope drive and thereby initiating the return of the carriage. That is to say, the movement or else the pull of the driving rope is made effective to actuate the switch mechanism. Upon reversal of the driving power the carriage driving pull becomes effective in the opposite direction while presently also the opposite pawl 22a operates to block rotation of the drum while the carriage is again on its way with the scraper 16 however in predetermined inoperative raised position.

Figure 4:
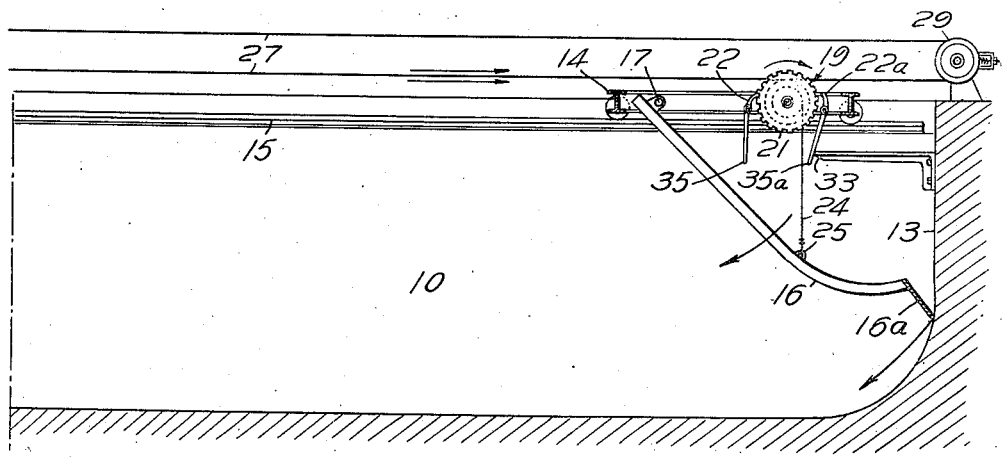
Fig. 4 is a view of a longitudinal tank section showing the carriage at the end of its inoperative return stroke and the sludge collector as being lowered to operative position.
Figure 5:
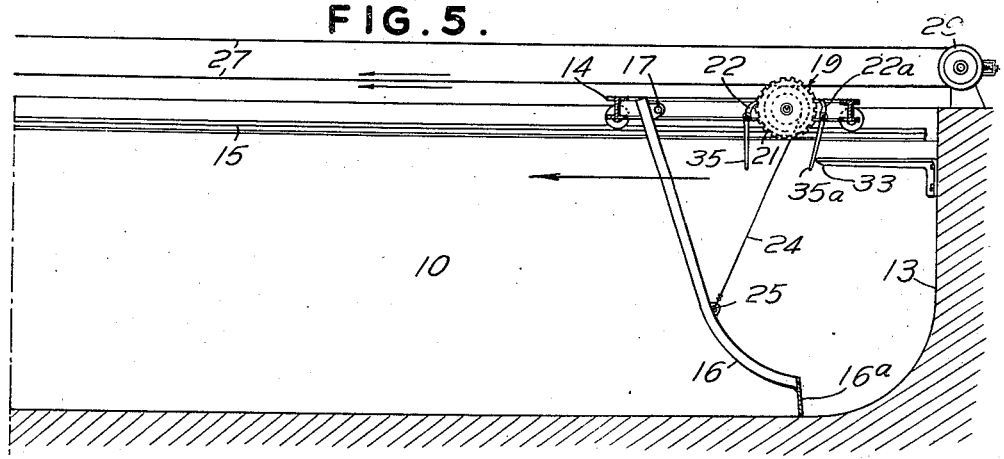
Fig. 5 is a view of a longitudinal tank section showing the carriage being reversed and started on its operating stroke.

A sequence of operating phases similar to the one just described takes place when the carriage now reaches the end of its inoperative return movement (see Fig. 4). Again towards the end of the carriage stroke, the free end 35a of the pawl 22a is released from its locking engagement with the ratchet wheel 21. The carriage reaches a positive stop and the driving rope 27 continues to pull in order to lower the sludge scraper 16 by the relative rotation of the winding drum 20. Again as soon as the scraper has reached its predetermined lowered operative position (see Fig. 5) a dog member upon the main drive rope 27 will become effective to swing the reversal switch 31 for a return movement of the carriage in an automatic renewal of the cycle. That is to say the pawl 35a returns to normal position while the opposite pawl 35 is rendered effective by the driving pull to lock the winding drum 20 while the carriage is operating.

The detailed function of the carriage control and reversal switch mechanism in relation to the other operating phases of the cycle will be more clearly understood from the diagram of Fig. 9, inasmuch as Figure 9 is a complete although condensed showing of the tank and its rope driving mechanism, illustrating the respective operating phases of switch actuating dog members 45 and 46 along the path of the rope. When the sludge raking element 48 is in sludge conveying position approaching the sludge outlet end of the tank through the positive driving movement of the rope 47, a dog member as indicated in full line position 45 upon the lower strand is ready to act as soon as the carriage has come to an end stop, when the winding drum 49 normally locked against rotation is released as previously described. Continued movement of the driving rope 47 through the motor and driving sheave 51 will now relatively advance the dog member 45 into the 45a position (dotted) a distance S toward the control and reversal switch 44. The distance S is substantially corresponding to an equivalent shortening or winding up of the sludge scraper positioning rope 50 which brings the sludge scraper 48 into inoperative position. At the end of its relative advance S the dog member is in a position 45a to trip the switch 44 into the dotted position 44a to reverse the driving direction of the rope when the latter is again locked to the carriage and operates to return the carriage with the sludge scraper raised, to the opposite end of the tank. By the time this opposite end is reached the dog member 46 upon the upper strand of the rope 47 will have travelled to the dotted position 46a. Again the winding drum 49 upon the carriage is unlocked in the manner previously described and continued movement of the rope will rotate the winding drum 49 in a direction to unwind the sludge scraper positioning rope 50 thereby lowering the sludge conveying member 48 into operative position. Concurrently the upper dog member 46 will have advanced the equivalent distance S from its 46a position to a position 46b, at which moment it will act to return the switch from its 44a to 44 position and thereby initiate again the sludge conveying stroke of the carriage.

I claim:

1. In a sedimentation tank, a reciprocating sludge collecting and conveying mechanism which comprises a carriage, a sludge raking element depending from said carriage supported therefrom for operative and inoperative sludge rake positioning relative to the tank bottom, a reversible carriage-driving means including a linear flexible element for imparting driving pull to the carriage, mechanism associated with said flexible driving element and operable thereby upon the carriage for controlling the positioning of the sludge raking element, abutment means stationary relative to the carriage and control means upon the carriage responsive to said abutment means, said control means thereby, effective to operate the rake positioning mechanism through the driving pull of said flexible element substantially at a point where continued movement of the carriage is arrested.

2. A sludge conveying mechanism according to claim 1, in which the mechanism for controlling the positioning of the sludge raking element comprises a winding mechanism for lifting and lowering the sludge collector.

3. A sludge conveying mechanism according to claim 1, in which the mechanism for controlling the positioning of the sludge raking element comprises a winding drum element directly rotatable through the pull of said linear flexible element.

4. In a sedimentation tank, a reciprocating sludge collecting and conveying mechanism which comprises a carriage, a sludge raking element supported therefrom and positionable to be operative and inoperative respectively relative to the tank bottom, a carriage driving mechanical means including a linear flexible element for imparting driving pull to the carriage, mechanism associated with said flexible driving element and operable thereby for controlling the positioning of the sludge raking element, abutment means stationary relative to the carriage, said mechanism for controlling the positioning of the sludge raking element comprising a winding means rotatable upon the carriage through said linear flexible driving element, pawl and ratchet means cooperatively associated with said winding means and normally operative to secure the said winding means against rotation relative to the carriage while the same is operating, said pawl and ratchet means being responsive to said abutment means and thereby effective to release said winding means for rotation by said flexible element at a predetermined phase of carriage operation.

5. In a sedimentation tank, a reciprocating sludge collecting and conveying mechanism which comprises a carriage, a sludge raking element supported therefrom and positionable to be operative and inoperative respectively relative to the tank bottom, a carriage driving mechanical means including a linear flexible element for imparting driving pull to the carriage, mechanism associated with said flexible driving element and operable thereby for controlling the positioning of the sludge raking element, and abutment means stationary relative to the carriage, said mechanism for controlling the positioning of the sludge raking element comprising a winding means rotatable upon the carriage through said linear flexible driving element, locking means cooperatively associated with said winding means and normally operative to secure said winding means against rotation relative to the carriage while the same is operating, said locking means being responsive to said abutment means and thereby effective to release said winding means for rotation by said flexible element at a predetermined phase of the carriage operation.

6. In a sedimentation tank, a reciprocating sludge collecting and conveying mechanism which comprises a carriage, a sludge raking element supported therefrom and positionable to be operative and inoperative respectively relative to the tank bottom, a carriage driving mechanical means including a linear flexible element for imparting driving pull to the carriage, mechanism associated with said flexible driving element and operable thereby for controlling the positioning of the sludge raking element, abutment means stationary relative to the carriage, said mechanism for controlling the positioning of the sludge raking element comprising a winding means rotatable upon the carriage through said linear flexible driving element, a ratchet rotatable at a fixed ratio with said winding means, a pawl pivoted upon the carriage and normally engaged upon the ratchet in a manner to check the relative rotation of said winding means against the pull of said flexible driving element to allow the carriage to be directly propelled by said driving element, said stationary abutment means effective to disengage said pawl in order to permit rotation of said winding means for the resetting of the sludge raking element through movement of said flexible driving element relative to the carriage while the latter is substantially held at rest.

7. In a sedimentation tank, a reciprocating sludge collecting and conveying mechanism which comprises a carriage, a sludge raking element supported therefrom and positionable to be operative and inoperative respectively relative to the tank bottom, a reversible carriage driving mechanical means including a linear flexible element for imparting driving pull to the carriage, and also including a stationary prime mover associated with the driving element for moving the same, mechanism associated with the carriage and with said flexible driving element and operable thereby for controlling the positioning of the sludge raking element, abutment means stationary relative to the carriage, control means upon the carriage responsive to said abutment means, said control means thereby effective to operate the rake positioning mechanism through the driving pull of said flexible element substantially at a point where continued movement of the carriage is arrested, said control means also effective upon reversing the movement of the carriage and release from said abutment means to retain the rake in its then position, and a reversing mechanism for the motive power, which comprises actuating means effective to operate said reversing mechanism at predetermined phases of the carriage operation in response to movement of the flexible driving element relative to said reversing mechanism.

8. In a sedimentation tank, a reciprocating sludge collecting and conveying mechanism which comprises a carriage, a sludge raking element supported therefrom and positionable to be operative and inoperative respectively relative to the tank bottom, a reversible carriage driving mechanical means including a linear flexible element for imparting driving pull to the carriage, and also including an electric motor for moving the carriage through the medium of said flexible element, mechanism associated with the carriage and with said flexible driving element and operable thereby for controlling the positioning of the sludge raking element, abutment means stationary relative to the carriage, control means upon the carriage responsive to said abutment means, said control means thereby effective to operate the rake positioning mechanism through the driving pull of said flexible element substantially at a point where continued movement of the carriage is arrested, said control means also effective upon reversing the movement of the carriage and release from said abutment means to retain the rake in its then position, a reversal switch mechanism for the motive power, and actuating means effective to operate said switch mechanism through the movement of said flexible drive member relative to said reversing mechanism.

9. In a sedimentation tank, a reciprocating sludge collecting and conveying mechanism which comprises a carriage, a sludge raking element supported therefrom and positionable to be operative and inoperative respectively relative to the bottom, a reversible carriage driving mechanical means including a linear flexible element for imparting driving pull to the carriage, and also including a prime mover associated with the driving element for moving the same, mechanism associated with the carriage and with said flexible driving element and operable thereby for controlling the positioning of the sludge raking element, abutment means stationary relative to the carriage, control means upon the carriage responsive to said abutment means, said control means thereby effective to operate the rake positioning mechanism through the driving pull of said flexible element substantially at a point where continued movement of the carriage is arrested, a switch mechanism operable for reversing the driving impulse for said carriage as derived from said prime mover, and actuating mechanism effective to operate said switch mechanism through the pull of the said flexible driving element.

NELS B. LUND.